(12) United States Patent
Kobayashi

(10) Patent No.: US 10,666,970 B2
(45) Date of Patent: May 26, 2020

(54) ENCODING APPARATUS, ENCODING METHOD, AND STORAGE MEDIUM

(71) Applicant: CANON KABUSHIKI KAISHA, Tokyo (JP)

(72) Inventor: Yukifumi Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 15/348,153

(22) Filed: Nov. 10, 2016

(65) Prior Publication Data
US 2017/0142439 A1 May 18, 2017

(30) Foreign Application Priority Data
Nov. 18, 2015 (JP) ................................ 2015-225618

(51) Int. Cl.
| | |
|---|---|
| *H04N 19/115* | (2014.01) |
| *H04N 19/50* | (2014.01) |
| *H04N 19/134* | (2014.01) |
| *H04N 19/567* | (2014.01) |
| *H04N 19/56* | (2014.01) |
| *H04N 19/172* | (2014.01) |
| *H04N 19/573* | (2014.01) |
| *H04N 19/137* | (2014.01) |

(Continued)

(52) U.S. Cl.
CPC ............ *H04N 19/56* (2014.11); *H04N 19/109* (2014.11); *H04N 19/137* (2014.11); *H04N 19/172* (2014.11); *H04N 19/521* (2014.11); *H04N 19/573* (2014.11)

(58) Field of Classification Search
CPC .... H04N 19/56; H04N 19/573; H04N 19/137; H04N 19/521; H04N 19/172; H04N 19/109
See application file for complete search history.

(56) References Cited

U.S. PATENT DOCUMENTS 6,052,414 A * 4/2000 Lee .................... H04N 19/51
 348/699
6,101,313 A * 8/2000 Igarashi ............... H04N 19/00
 375/E7.133

(Continued)

FOREIGN PATENT DOCUMENTS

| JP | 2008-011117 A | 1/2008 |
| JP | 2013-236392 | 11/2013 |
| WO | 2009/095962 A1 | 8/2009 |

OTHER PUBLICATIONS

U.S. Appl. No. 15/333,362, dated Oct. 25, 2016.

*Primary Examiner* — Philip P. Dang
(74) *Attorney, Agent, or Firm* — Venable LLP

(57) ABSTRACT

There is provided an encoding apparatus comprising. An acquiring unit acquires a motion amount of an encoding target image. A selecting unit selects a reference image from a plurality of reference image candidates. An encoding unit encodes the encoding target image by motion-compensated predictive coding in which the selected reference image is referenced. If the motion amount is less than a threshold value, the selecting unit selects a reference image candidate having a larger encoded data amount with priority. If the motion amount is greater than the threshold value, the selecting unit selects a reference image candidate having a closer temporal distance from the encoding target image with priority.

15 Claims, 12 Drawing Sheets

(51) Int. Cl.
*H04N 19/109* (2014.01)
*H04N 19/513* (2014.01)

(56) References Cited

U.S. PATENT DOCUMENTS

| | | | | |
|---|---|---|---|---|
| 6,124,995 A * | 9/2000 | Kim | ................... | G11B 5/0086 |
| | | | | 360/48 |
| 8,073,048 B2 * | 12/2011 | Tourapis | .............. | H04N 19/105 |
| | | | | 375/240.01 |
| 8,130,838 B2 * | 3/2012 | Fukuda | ................ | H04N 19/105 |
| | | | | 375/240.16 |
| 8,226,560 B2 * | 7/2012 | Arai | ........................ | A61B 8/13 |
| | | | | 600/443 |
| 8,275,034 B2 * | 9/2012 | Sakamoto | ............ | H04N 19/172 |
| | | | | 375/240.12 |
| 8,471,945 B2 * | 6/2013 | Muramatsu | ........ | H04N 1/00442 |
| | | | | 348/333.11 |
| 8,472,668 B2 * | 6/2013 | Hu | ....................... | G06K 9/6807 |
| | | | | 382/103 |
| 8,660,175 B2 * | 2/2014 | Dane | ...................... | H04N 5/145 |
| | | | | 370/241 |
| 8,735,845 B2 * | 5/2014 | Takasawa | .............. | A61B 6/461 |
| | | | | 250/394 |
| 8,736,671 B2 * | 5/2014 | Nakamura | ........... | H04N 13/178 |
| | | | | 348/46 |
| 8,897,368 B2 | 11/2014 | Maruyama et al. | ......................... | |
| | | | | H04N 19/00727 |
| 8,953,685 B2 * | 2/2015 | Dane | ...................... | H04N 5/145 |
| | | | | 348/459 |
| 9,008,181 B2 * | 4/2015 | Chen | .................... | H04N 19/159 |
| | | | | 375/240.15 |
| 9,076,064 B2 * | 7/2015 | Shiiyama | ................ | G06K 9/4671 |
| 9,094,689 B2 * | 7/2015 | Yu | ........................ | H04N 19/105 |
| 9,124,899 B2 * | 9/2015 | Misra | .................... | H04N 19/52 |
| 2008/0255860 A1 * | 10/2008 | Osada | .................. | G10L 19/022 |
| | | | | 704/503 |
| 2010/0303155 A1 | 12/2010 | Maruyama et al. | | |
| 2011/0255597 A1 * | 10/2011 | Mihara | ................ | H04N 19/176 |
| | | | | 375/240.16 |
| 2011/0268185 A1 * | 11/2011 | Watanabe | .......... | H04N 21/2343 |
| | | | | 375/240.03 |
| 2012/0213452 A1 * | 8/2012 | Matsuyama | .......... | G06T 3/4053 |
| | | | | 382/294 |
| 2012/0300849 A1 * | 11/2012 | Yasugi | ................... | H04N 19/61 |
| | | | | 375/240.16 |
| 2012/0316441 A1 * | 12/2012 | Toma | ................... | A61B 8/4245 |
| | | | | 600/441 |
| 2012/0328005 A1 * | 12/2012 | Yu | ........................ | H04N 19/105 |
| | | | | 375/240.03 |
| 2013/0016788 A1 * | 1/2013 | Oh | ........................ | H04N 19/107 |
| | | | | 375/240.16 |
| 2013/0114720 A1 * | 5/2013 | Wang | ................... | H04N 19/197 |
| | | | | 375/240.16 |
| 2014/0023140 A1 * | 1/2014 | Wahadaniah | ........ | H04N 19/105 |
| | | | | 375/240.12 |
| 2014/0044186 A1 | 2/2014 | Maruyama et al. | | |
| 2014/0086322 A1 * | 3/2014 | Takahashi | ............ | H04N 19/597 |
| | | | | 375/240.12 |
| 2014/0092970 A1 * | 4/2014 | Misra | ..................... | H04N 19/52 |
| | | | | 375/240.16 |
| 2014/0119712 A1 * | 5/2014 | Jang | ........................ | H04N 9/80 |
| | | | | 386/248 |
| 2014/0161186 A1 * | 6/2014 | Zhang | ................... | H04N 19/597 |
| | | | | 375/240.16 |
| 2014/0289641 A1 * | 9/2014 | Whitcroft | ............. | G06F 3/0482 |
| | | | | 715/745 |
| 2014/0301657 A1 * | 10/2014 | Hattori | ............... | G06K 15/1836 |
| | | | | 382/239 |
| 2015/0010082 A1 * | 1/2015 | Iwata | ................... | H04N 19/105 |
| | | | | 375/240.16 |
| 2015/0054970 A1 * | 2/2015 | Hamada | .................... | G06T 5/50 |
| | | | | 348/208.1 |
| 2015/0161790 A1 * | 6/2015 | Takahashi | ............ | A61B 5/0245 |
| | | | | 600/424 |
| 2015/0178152 A1 * | 6/2015 | Cai | ........................ | G11C 5/147 |
| | | | | 714/757 |
| 2015/0206024 A1 * | 7/2015 | Sasaki | ..................... | G06T 5/002 |
| | | | | 382/190 |
| 2015/0265241 A1 * | 9/2015 | Belt | ..................... | A61B 8/0833 |
| | | | | 600/424 |
| 2015/0281709 A1 * | 10/2015 | Bracha | .................. | H04N 19/36 |
| | | | | 375/240.26 |

* cited by examiner

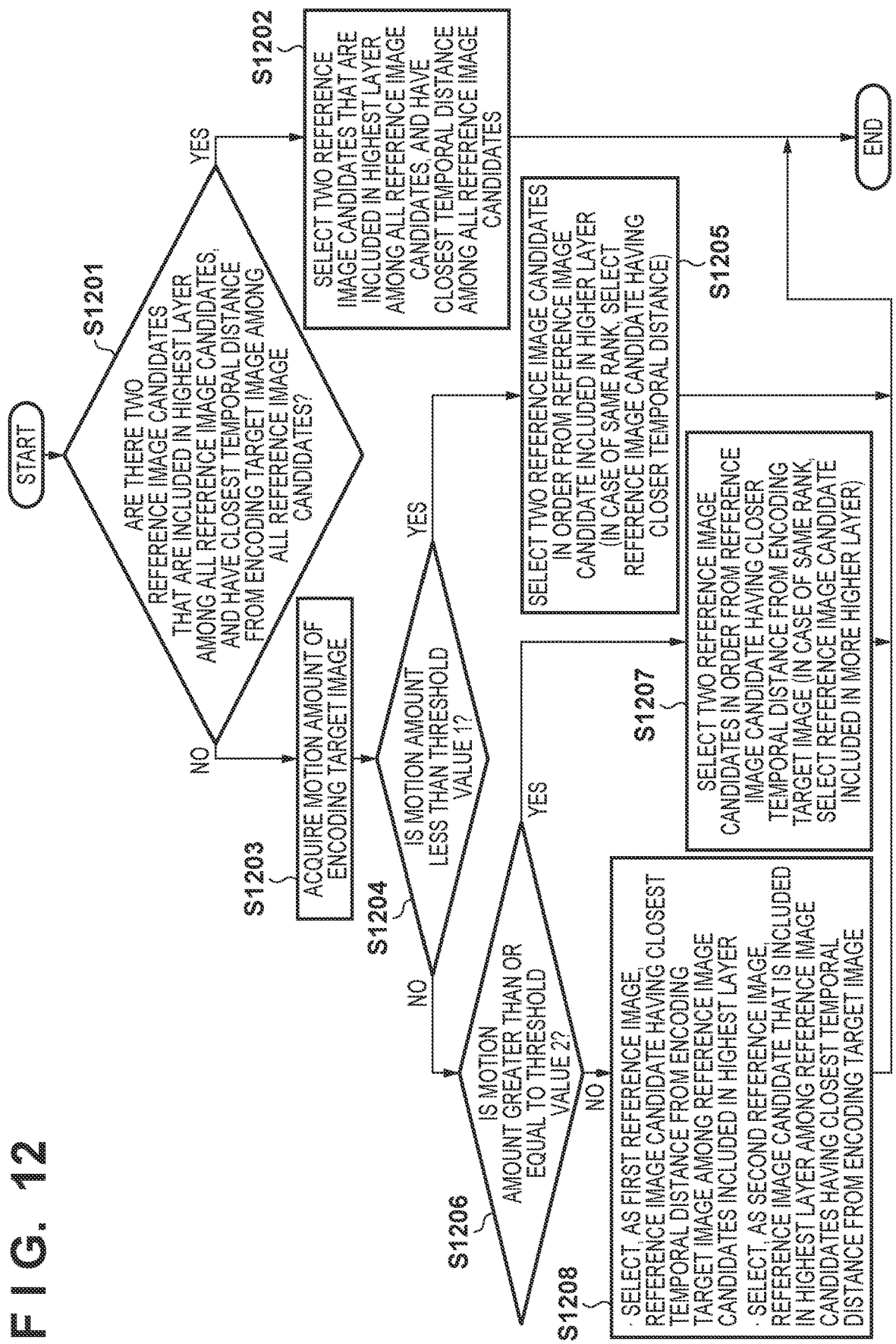
F I G. 12

ENCODING APPARATUS, ENCODING METHOD, AND STORAGE MEDIUM

BACKGROUND OF THE INVENTION

Field of the Invention

The present invention relates to an encoding apparatus, an encoding method, and a storage medium.

Description of the Related Art

The HEVC (high efficiency video coding) method, which is a more efficient moving image coding method, has been drawn up as an international standard for succeeding the H.264 coding method.

Interframe predictive coding can be used in both the H.264 coding method and the HEVC coding method. In interframe predictive coding, efficient encoding can be performed by predicting motion between an encoding target image that is to be encoded and a reference image that is a local decoded image that has been already encoded, and obtaining the difference between the images at a motion-compensated position.

Incidentally, if a subject moves a large amount, there will be a large amount of motion between the encoding target image and the reference image, and there is a possibility that the calculation amount for motion prediction will increase and the precision in motion prediction will decrease. Also, in general, the more the encoding target image and the reference image are temporally distant, the more the amount of motion between the encoding target image and the reference image increases. In view of this, if the subject moves a large amount, it is conceivable to use an image that is temporally closer to the encoding target image as the reference image, compared to the case where the amount of motion is not large (see Japanese Patent Laid-Open No. 2013-236392).

The quality of the encoding target image depends not only on precision in motion prediction but also on the quality of the reference image. In general, the more the encoded data amount is, the higher the quality of the reference image is, and the higher the quality of the reference image is, the higher the quality of the encoding target image that is to be encoded with reference to this reference image is. However, in Japanese Patent Laid-Open No. 2013-236392, when the reference image is selected, the precision in motion prediction is considered, but the encoded data amount of the reference image is not considered.

SUMMARY OF THE INVENTION

In view of this, the present invention makes it possible to select a reference image with consideration given to motion of a subject and the encoded data amount of the reference image.

According to a first aspect of the present invention, there is provided an encoding apparatus comprising: an acquiring unit configured to acquire a motion amount of an encoding target image; a selecting unit configured to select a reference image from a plurality of reference image candidates; and an encoding unit configured to encode the encoding target image by motion-compensated predictive coding in which the selected reference image is referenced, wherein if the motion amount is less than a threshold value, the selecting unit selects a reference image candidate having a larger encoded data amount with priority, and if the motion amount is greater than the threshold value, the selecting unit selects a reference image candidate having a closer temporal distance from the encoding target image with priority.

According to a second aspect of the present invention, there is provided an encoding method comprising: acquiring a motion amount of an encoding target image; selecting a reference image from a plurality of reference image candidates; and encoding the encoding target image by motion-compensated predictive coding in which the selected reference image is referenced, wherein if the motion amount is less than a threshold value, the selecting selects a reference image candidate having a larger encoded data amount with priority, and if the motion amount is greater than the threshold value, the selecting selects a reference image candidate having a closer temporal distance from the encoding target image with priority.

According to a third aspect of the present invention, there is provided a non-transitory computer-readable storage medium which stores a program for causing a computer to execute an encoding method comprising: acquiring a motion amount of an encoding target image; selecting a reference image from a plurality of reference image candidates; and encoding the encoding target image by motion-compensated predictive coding in which the selected reference image is referenced, wherein if the motion amount is less than a threshold value, the selecting selects a reference image candidate having a larger encoded data amount with priority, and if the motion amount is greater than the threshold value, the selecting selects a reference image candidate having a closer temporal distance from the encoding target image with priority.

Further features of the present invention will become apparent from the following description of exemplary embodiments with reference to the attached drawings.

BRIEF DESCRIPTION OF THE DRAWINGS

FIG. 12 is a flowchart showing a flow of reference image selection processing according to the second embodiment.

DESCRIPTION OF THE EMBODIMENTS

Hereinafter, embodiments of the present invention will be described with reference to the drawings. However, embodiments of the present invention are not limited to the following embodiments.

First Embodiment

Figure 1:
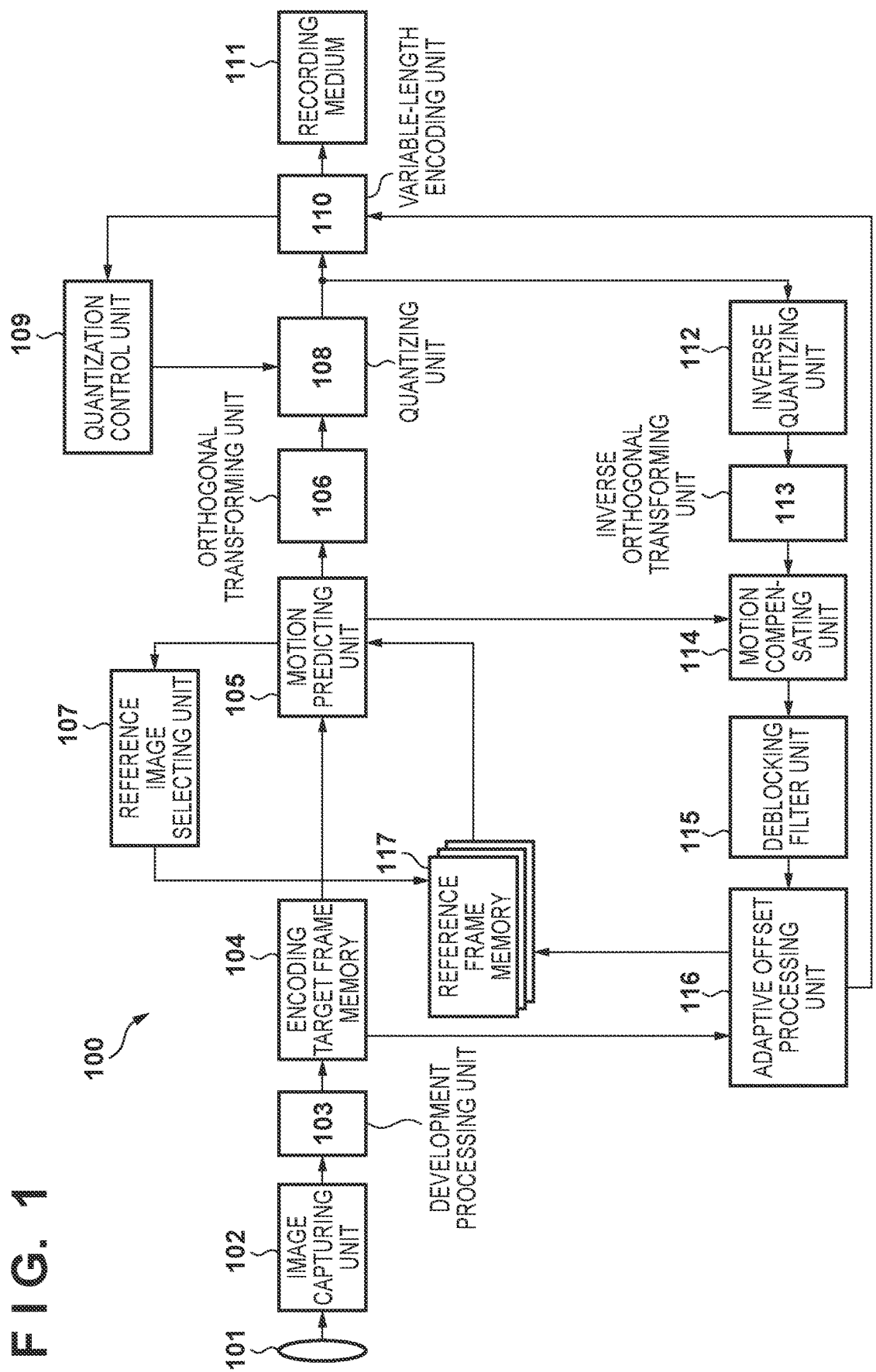
FIG. 1 is a block diagram for illustrating an example of constituent elements included in an encoding apparatus 100 according to a first embodiment and a second embodiment.

FIG. 1 is a block diagram for illustrating an example of constituent elements included in an encoding apparatus 100 according to a first embodiment and a second embodiment. The encoding apparatus 100 operates as an encoding apparatus that realizes the HEVC (high efficiency video coding) method, for example. Also, the encoding apparatus 100 operates as an encoding apparatus that performs encoding using a random access GOP structure in the HEVC method. Note that at least some of the constituent elements included in the encoding apparatus 100 have a hardware configuration.

The encoding apparatus 100 shown in FIG. 1 also has a function as an image capturing apparatus, but this function is not essential. For example, the encoding apparatus 100 may encode an image generated by an external image capturing apparatus.

An image capturing unit 102 captures an image that has been input to the image capturing unit 102 through a lens 101. The image capturing unit 102 captures an image of a subject, and outputs moving image data. The image in each frame in the moving image data that has been captured by the image capturing unit 102 is converted to digital RAW image data, and provided to a development processing unit 103.

The development processing unit 103 performs image processing such as debayer processing, defect correction processing, noise removal processing, scaling processing, and color conversion processing (processing of conversion to YCbCr format, for example), on the digital RAW image data in each frame in the moving image data that is input, and generates developed moving image data. The frames in the moving image data generated by the development processing unit 103 are successively input to an encoding target frame memory 104. In the present embodiment, image data in the respective frames of the moving image data that has been generated by the development processing unit 103 is referred to as encoding target image.

The subsequent encoding processing is performed for each CTU (coding tree unit). The CTU is selected from a block size of 8×8 pixels to 64×64 pixels. A motion predicting unit 105 performs, for each CTU, block matching between an encoding target image stored in the encoding target frame memory 104 and a reference image stored in a reference frame memory 117, and detects motion amounts and motion vectors. The motion predicting unit 105 calculates a difference in pixels between the encoding target image and a prediction image at a position of the detected motion vector, and outputs the difference image to an orthogonal transforming unit 106. Therefore, the encoding apparatus 100 encodes the encoding target image by motion-compensated predictive coding. Also, the motion predicting unit 105 outputs, for producing a local decoded image, a prediction image at the position of the detected motion vector to a motion compensating unit 114. Furthermore, the motion predicting unit 105 outputs the detected motion amount to the reference image selecting unit 107.

The reference image selecting unit 107 selects a reference image for encoding the subsequent pictures in accordance with the motion amount that has been input by the motion predicting unit 105. The details of the operations of the reference image selecting unit 107 and motion amounts will be described later.

The orthogonal transforming unit 106 performs discrete cosine transform on the difference image that has been input by the motion predicting unit 105, generates a transformation coefficient, and output the generated transformation coefficient to a quantizing unit 108. The quantizing unit 108 performs quantization on the transformation coefficient that has been sent from the orthogonal transforming unit 106 in accordance with a quantization step size that is output by a quantization control unit 109. In order to produce an encoded stream, the quantizing unit 108 outputs the quantized transformation coefficient to a variable-length encoding unit 110. Also, in order to produce a local decoded image, the quantizing unit 108 outputs the quantized transformation coefficient to an inverse quantizing unit 112.

The variable-length encoding unit 110 performs zigzag scanning, alternate scanning, or the like on the quantized transformation coefficient to perform variable-length encoding. The variable-length encoding unit 110 adds information obtained by performing variable-length encoding on the encoding method information such as the motion vector, quantization step size, CTU size, and parameters for adaptive offset processing, to the transformation coefficient that has undergone variable-length encoding, and generates an encoded stream. The encoded stream that has been generated is recorded in a recording medium 111. Also, the variable-length encoding unit 110 calculates generated encoded data amounts of each CTU at the time of encoding, and outputs the calculated generated encoded data amount to the quantization control unit 109.

The quantization control unit 109 determines a quantization step size using the generated encoded data amount sent from the variable-length encoding unit 110 such that the generated encoded data amount is a target encoded data amount, and outputs the quantization step size to the quantizing unit 108.

The inverse quantizing unit 112 performs inverse quantization on the quantized transformation coefficient that has been sent from the quantizing unit 108, and generates a transformation coefficient for local decoding. This transformation coefficient is output to the inverse orthogonal transforming unit 113. The inverse orthogonal transforming unit 113 performs inverse discrete cosine transform on the transformation coefficient that has been sent from the inverse quantizing unit 112, and generates a difference image. The generated difference image is output to the motion compensating unit 114.

The motion compensating unit 114 generates image data for local decoding by adding the prediction image at the position of the motion vector that has been sent from the motion predicting unit 105 and the difference image that has been sent from the inverse orthogonal transforming unit 113. The generated image data is output to a deblocking filter unit 115. The deblocking filter unit 115 applies a deblocking filter to the image data that has been sent from the motion compensating unit 114. The image that has undergone deblocking filtering is output to an adaptive offset processing unit 116.

The adaptive offset processing unit 116 selects band offset processing, edge offset processing, or no processing, based on the encoding target image stored in the encoding target frame memory 104 and the image that has undergone deblocking filtering. Also, the adaptive offset processing unit 116 determines parameters for the selected processing, such as a band position, an edge direction, and an offset value for performing the adaptive offset processing. The adaptive offset processing unit 116 performs adaptive offset processing on the image that has undergone deblocking filtering in accordance with the determined parameter, and generates a local decoded image. This generated local decoded image is stored in the reference frame memory 117. Also, the adaptive offset processing unit 116 outputs parameters for adaptive offset processing, such as which processing was selected as the adaptive offset processing, the band position, the edge direction, and the offset value, to the variable-length encoding unit 110 so as to be included in the encoded stream.

Such an operation produces an encoded stream and a local decoded image.

Next, the motion amount detected by the motion predicting unit 105 will be described. Any index expressing the motion of an image may be used for the motion amount here. For example, the motion amount may be a vector length of a motion vector, or a motion-compensated sum of absolute differences between the encoding target image and the reference image. Also, a value obtained by calculating these values in combination may be used as the motion amount. As a simple method, the sum of absolute differences between the encoding target image and the reference image may be calculated without performing motion compensation, and the calculated value may be used as the motion amount.

Also, although the motion predicting unit 105 detects the motion amount at the same time as detection of motion vector used in encoding in the present embodiment, the motion predicting unit 105 may detect motion with another operation. For example, the motion predicting unit 105 performs detection with the vector length considered in the detection of motion vector used in encoding, taking encoding efficiency into consideration. On the other hand, in the detection of motion amount, the motion predicting unit 105 may select a position at which the difference amount is minimal in block matching as the motion vector for motion amount detection without considering the vector length.

Figure 2:
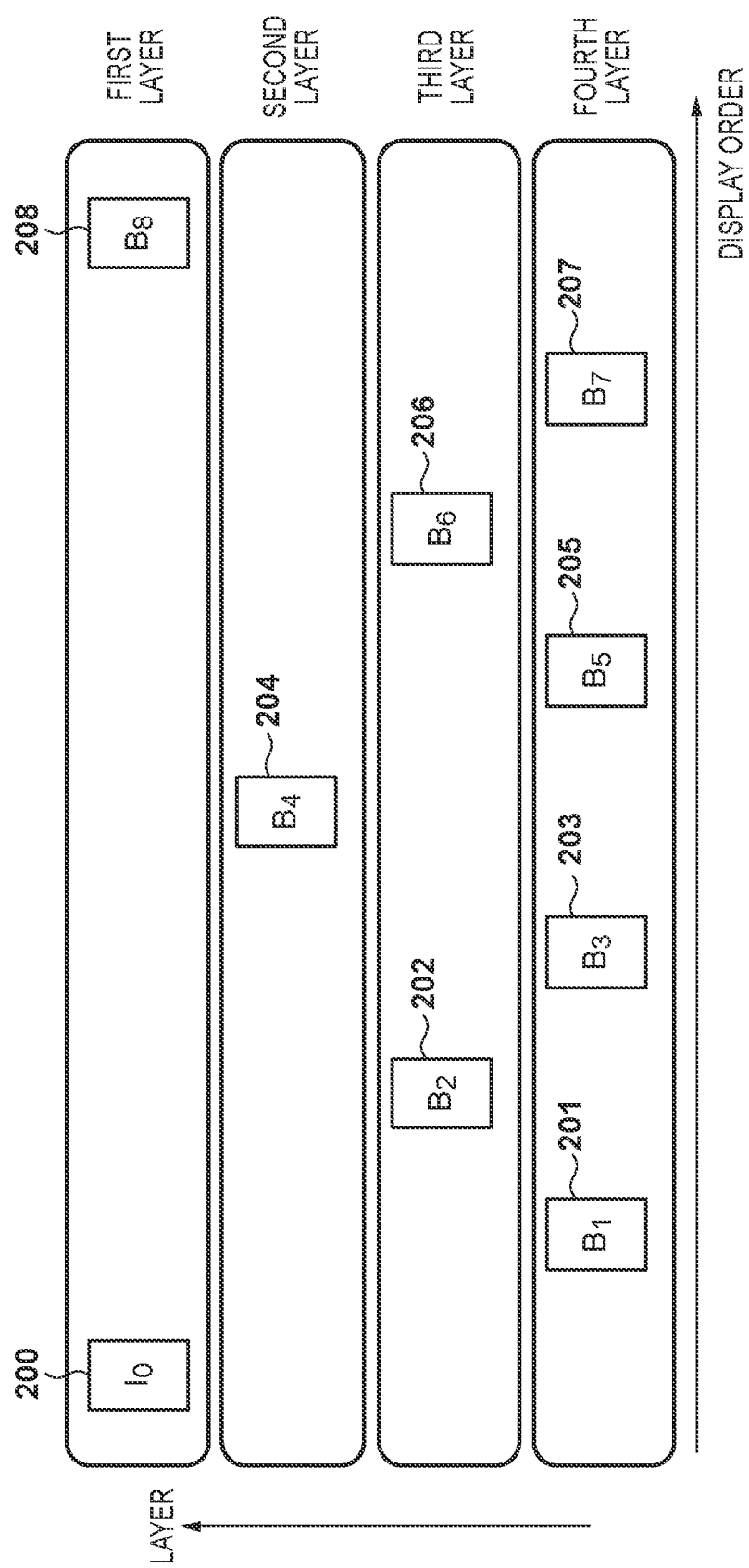
FIG. 2 is a diagram showing an example of a random access GOP structure.

Here, encoding using a random access GOP structure in the HEVC coding method will be described with reference to FIG. 2. The order of display of eight pictures shown in FIG. 2 is an $I_0$ picture 200, a $B_1$ picture 201, a $B_2$ picture 202, a $B_3$ picture 203, a $B_4$ picture 204, a $B_5$ picture 205, a $B_6$ picture 206, a $B_7$ picture 207, and a $B_8$ picture 208. The random access GOP structure shown in FIG. 2 has a hierarchical structure including four layers from a first layer to a fourth layer. The highest layer is the first layer, and the second layer, third layer, and fourth layer are lower layers in the stated order.

In the HEVC coding method, an ID number called Temporal ID is allocated to each layer. The Temporal ID is allocated such that "0" indicates the highest layer, and Temporal ID=0, 1, 2, and 3 are allocated to the first layer to the fourth layer in the stated order. For example, because the $I_0$ picture 200 is included in the first layer that is the highest layer, Temporal ID=0 is given thereto, and because the $B_1$ picture 201 is included in the fourth layer, Temporal ID=3 is given thereto.

There is a limitation on the reference relationship regarding the hierarchical structure, and thus only the same layer as the layer of the encoding target image or a higher layer can be referenced. For example, the $B_8$ picture 208 in the first layer can only reference the $I_0$ picture 200 in the same layer among the pictures shown in FIG. 2. The $B_4$ picture 204 in the second layer can only reference the $I_0$ picture 200 and the $B_8$ picture 208 in higher layers.

Because there is such a limitation on the reference relationship, there is also a limitation on the order of encoding pictures, such that a higher layer is prioritized in encoding to some extent. In the present embodiment, it is assumed that the $I_0$ picture 200, the $B_8$ picture 208, the $B_4$ picture 204, the $B_2$ picture 202, the $B_1$ picture 201, the $B_3$ picture 203, the $B_6$ picture 206, the $B_5$ picture 205, and the $B_7$ picture 207 are encoded in this order.

In general, from the viewpoint of encoding efficiency, a larger encoded data amount is allocated to a picture in a higher layer in encoding. It is conceivable that a picture having a larger allocated encoded data amount is unlikely to deteriorate in encoding, and thus is preferable as the reference image. Also, it is conceivable that in the same layer, a picture whose temporal distance from the encoding target image is closer has a higher correlation with the image and is preferable as the reference image.

Because most pictures in higher layers have been encoded at the time of encoding a picture in a lower layer, a picture included in the lower layer has wide choice of reference images. For example, if the $B_3$ picture 203 is the encoding target image, five pictures, namely, the $I_0$ picture 200, the $B_1$ picture 201, the $B_2$ picture 202, the $B_4$ picture 204, and the $B_8$ picture 208, serve as reference image candidates. The appropriate reference image changes in accordance with the motion amount of an image, and thus the reference image selecting unit 107 selects a reference image based on the motion amount. The following describes an example of selecting a reference image based on a motion amount in the case where only one reference image is used.

After the $I_0$ picture 200 is encoded, the encoding apparatus 100 encodes the $B_8$ picture 208. In this case, the reference image is the $I_0$ picture 200. The motion predicting unit 105 detects motion amounts of each CTU, and notifies the reference image selecting unit 107 of the detected motion amounts.

For each picture, the reference image selecting unit 107 performs cumulative addition on motion amounts of each CTU. Accordingly, when encoding of the $B_8$ picture 208 is completed, the overall motion amount of the $B_8$ picture 208 can be obtained. The overall motion amount of the $B_8$ picture 208 is held by the reference image selecting unit 107 as the motion amount between the $B_8$ picture 208 and the $I_0$ picture 200.

Next, the encoding apparatus 100 encodes the $B_4$ picture 204. In this case, there are two pictures, namely, the $I_0$ picture 200 and the $B_8$ picture 208, as the reference image candidates. The reference image selecting unit 107 selects the picture that is included in a higher layer and has a closer temporal distance from the encoding target image (that is, a picture that is unlikely to deteriorate in encoding and has a high correlation with the encoding target image). Because both the $I_0$ picture 200 and the $B_8$ picture 208 are included in the first layer, and have the same temporal distance from the $B_4$ picture 204, there is no substantial difference in the correlation between the images. Therefore, regardless of which picture is selected as the reference image, there is no large difference in encoding efficiency. Here, it is assumed that the $I_0$ picture 200 is used as the reference image. Similarly to the case where the $B_8$ picture 208 is encoded, the reference image selecting unit 107 performs cumulative addition of the motion amounts that have been detected by the motion predicting unit 105, and holds the resulting motion amount as the motion amount between the $B_4$ picture 204 and the $I_0$ picture 200.

Next, the encoding apparatus 100 encodes the $B_2$ picture 202. In this case, there are three pictures, namely, the $I_0$ picture 200, the $B_4$ picture 204, and the $B_8$ picture 208, as the reference image candidates. Because the $I_0$ picture 200 and the $B_8$ picture 208 are included in the first layer, they are included in a more higher layer than the $B_4$ picture 204 included in the second layer. Also, the $I_0$ picture 200 and the $B_4$ picture 204 have the closest temporal distance from the $B_2$ picture 202 that is the encoding target image. In view of this, the reference image selecting unit 107 selects the $I_0$ picture 200, which is the encoded image that is included in the highest layer and has the closest temporal distance, as the reference image.

Similarly, the encoding apparatus 100 encodes the $B_1$ picture 201. At this time, the reference image selecting unit 107 selects the $I_0$ picture 200 as the reference image for the same reason as when encoding the $B_2$ picture 202.

Figure 3:
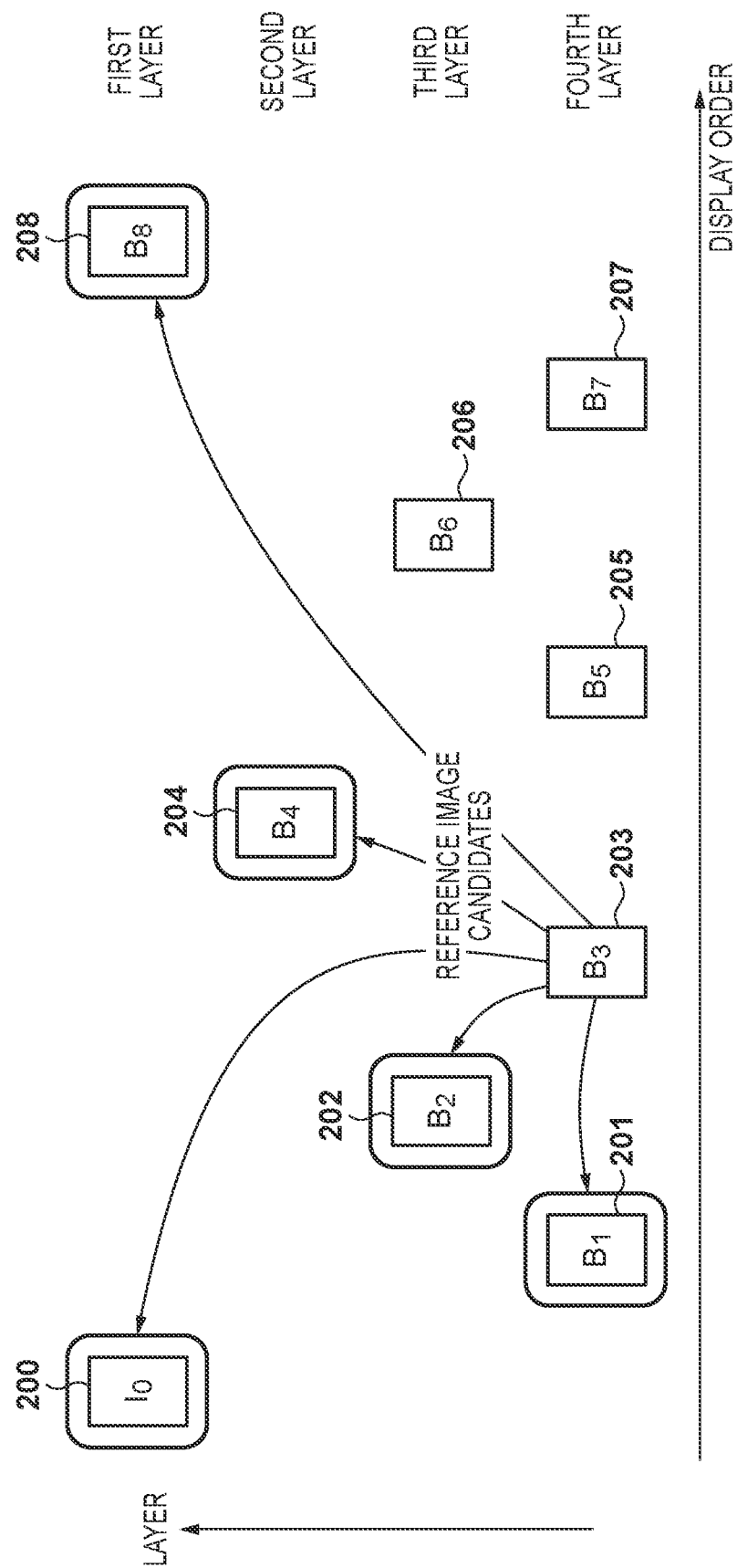
FIG. 3 is a diagram showing an example of reference image candidates when a $B_3$ picture 203 is encoded.
Figure 4:
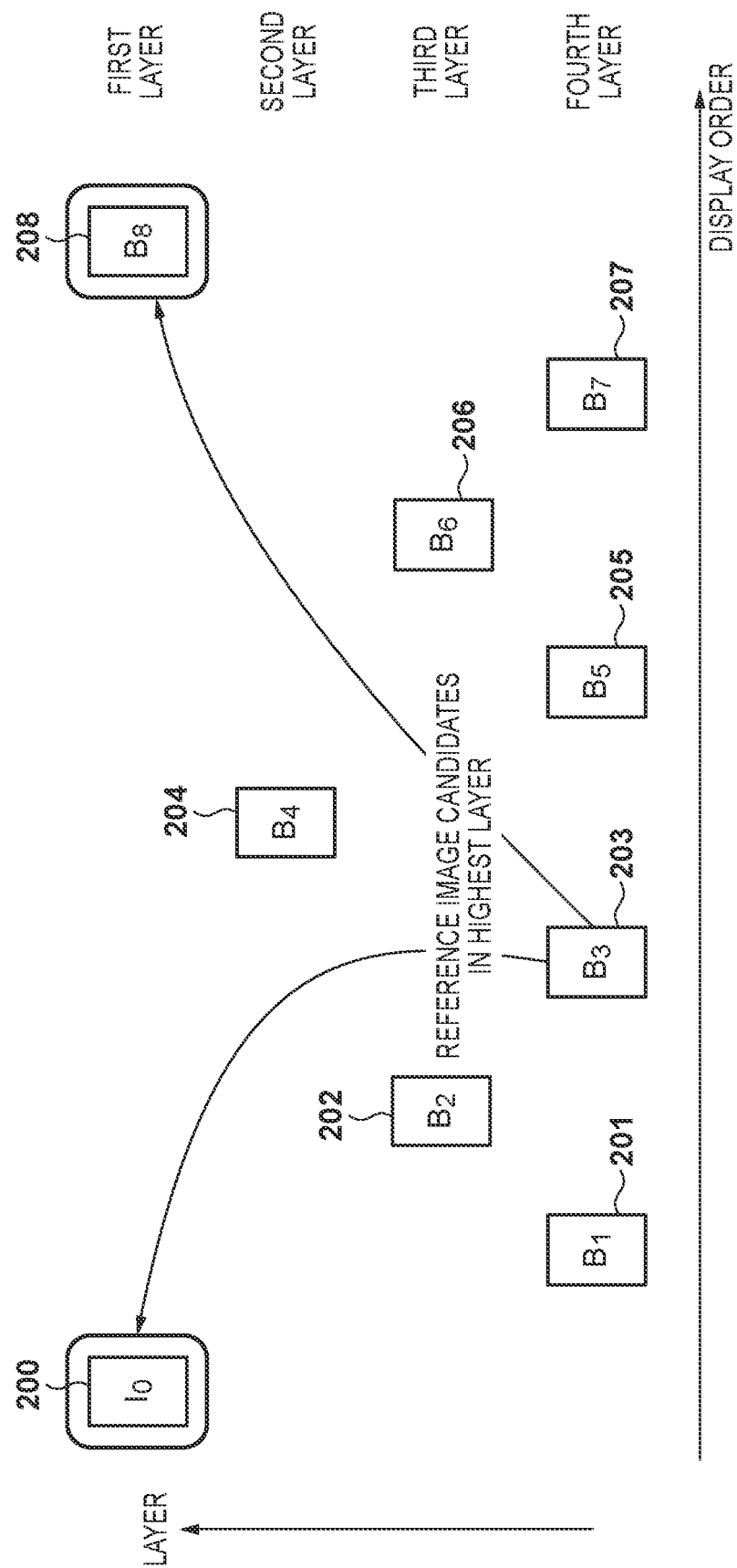
FIG. 4 is a diagram showing an example of reference image candidates included in the highest layer.
Figure 5:
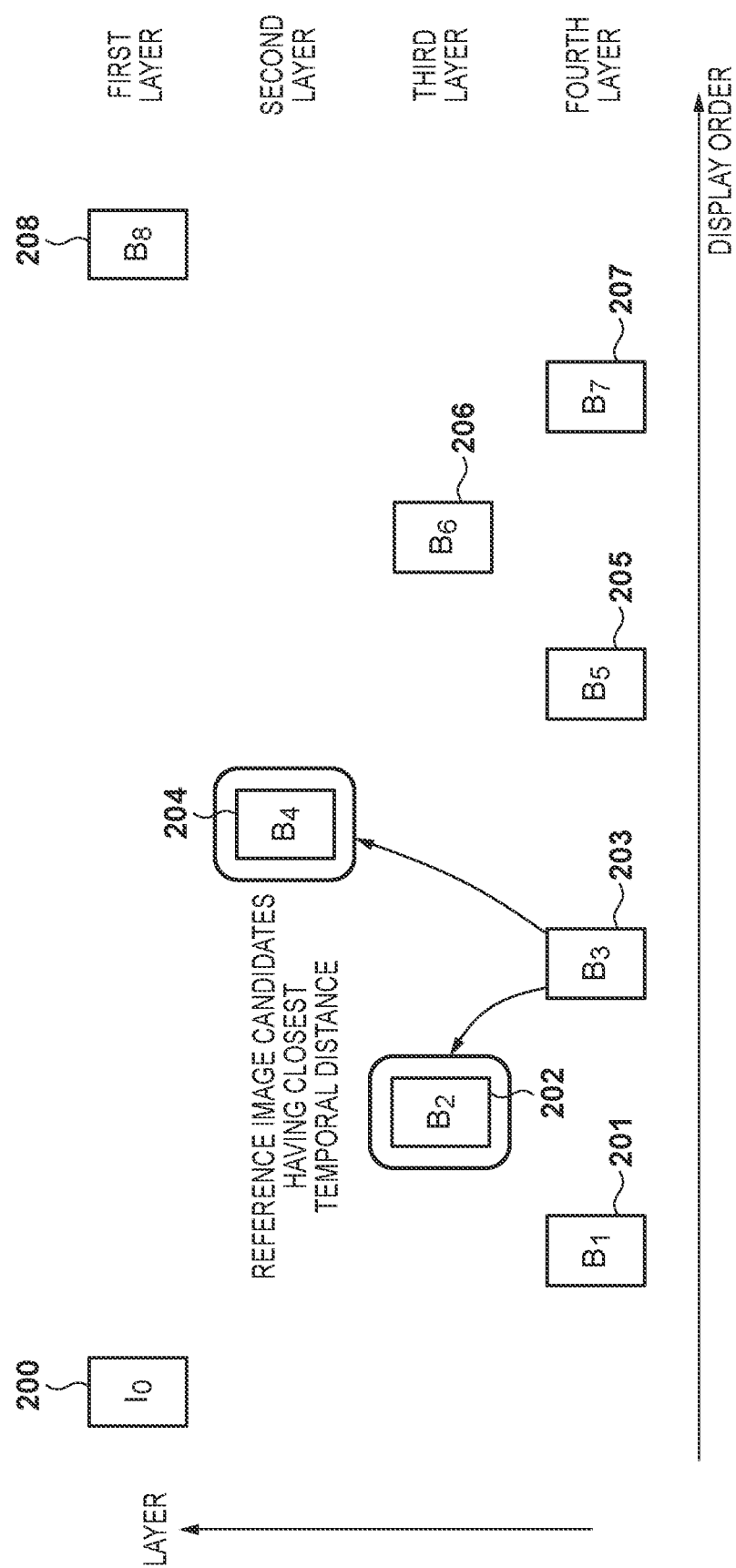
FIG. 5 is a diagram showing an example of reference image candidates having the closest temporal distance from the encoding target image.

Next, the encoding apparatus 100 encodes the $B_3$ picture 203. In this case, there are five pictures, namely, the $I_0$ picture 200, the $B_1$ picture 201, the $B_2$ picture 202, the $B_4$ picture 204, and the $B_8$ picture 208, as the reference image candidates (see FIG. 3). Among the reference image candidates, the reference image candidates included in the highest layer are the $I_0$ picture 200 and the $B_8$ picture 208 (see FIG. 4). Also, among the reference image candidates, the reference image candidates having the closest temporal distance from the $B_3$ picture 203 that is the encoding target image are the $B_2$ picture 202 in the third layer and the $B_4$ picture 204 in the second layer (see FIG. 5).

If the reference image candidates in the highest layer and the reference image candidates having the closest temporal distance are different from each other, the reference image selecting unit 107 selects the reference image adaptively. In order to estimate the motion amount of the $B_3$ picture 203 that is the encoding target image, the reference image selecting unit 107 uses a motion amount between the $I_0$ picture 200 and the $B_4$ picture 204 that are located before and after the $B_3$ picture 203 in terms of the display timing. The motion amount between the $I_0$ picture 200 and the $B_4$ picture 204 is detected when the $B_4$ picture 204 has been encoded previously and is held by the reference image selecting unit 107. As described above, any index for expressing the motion of an image may be used as the motion amount. For example, the motion amount between the $I_0$ picture 200 and the $B_4$ picture 204 is the vector length of the motion vector between the two pictures, the sum of absolute differences between the two pictures, or the motion-compensated sum of absolute differences between the two pictures.

Note that theoretically, the reference image selecting unit 107 can also use the motion amount between the $B_2$ picture 202 and the $B_4$ picture 204 that are located before and after the $B_3$ picture 203 in terms of the display timing. However, because the $B_4$ picture 204 is not used as the reference image when the $B_2$ picture 202 is encoded, this motion amount has not been detected yet. Thus, in the present embodiment, the reference image selecting unit 107 uses the motion amount between the $I_0$ picture 200 and the $B_4$ picture 204 that have been already detected.

Figure 6:
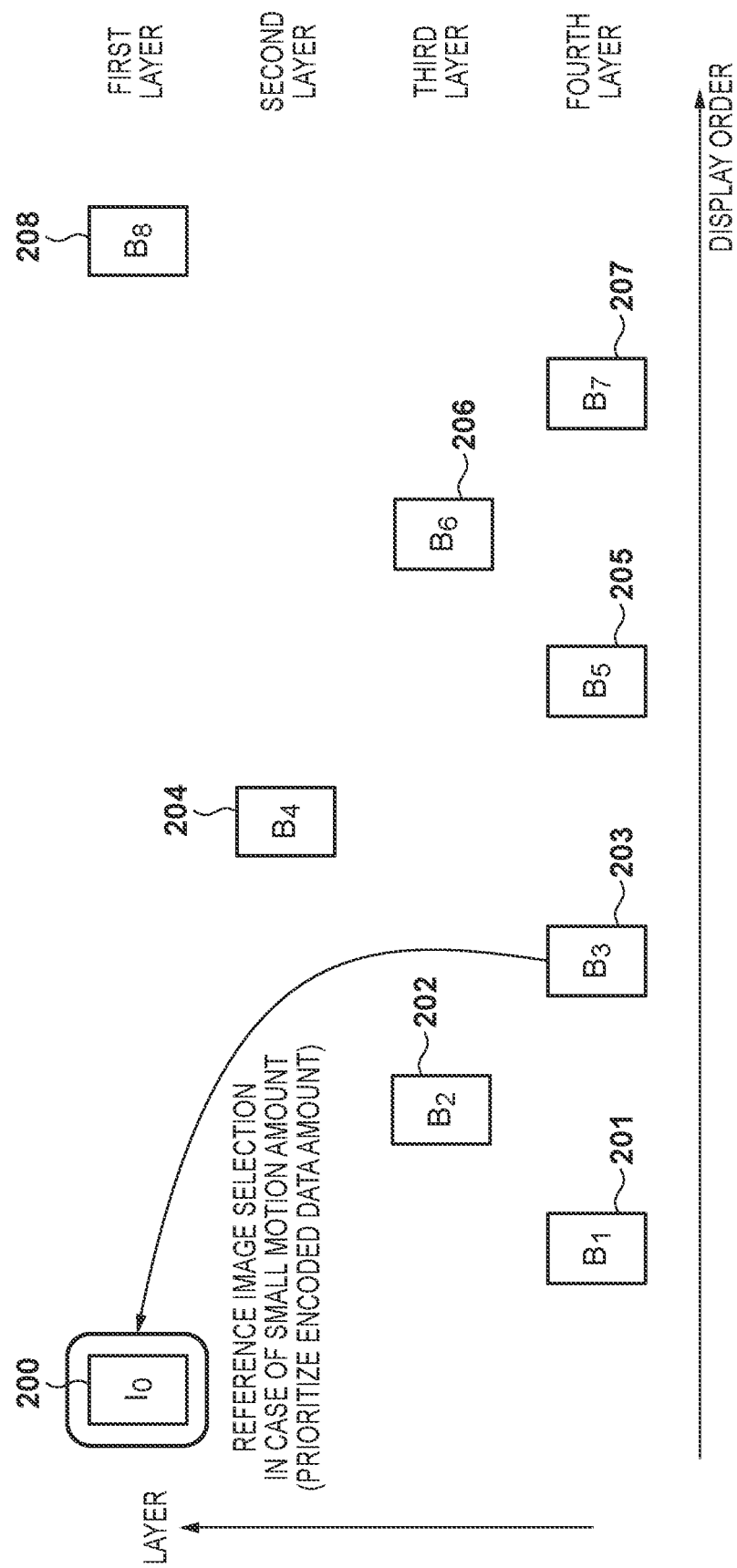
FIG. 6 is a diagram showing an example of selection of a reference image in the case where the encoding target image has a small motion amount.

If the motion amount between the $I_0$ picture 200 and the $B_4$ picture 204 is less than a threshold value, it is thought that the $B_3$ picture 203 that is located therebetween in terms of the display timing has also a small motion amount. In this case, it is thought that because the encoding target image has a small motion amount, regardless of the temporal distances between the encoding target image and each reference image candidate, all reference image candidates have high correlation. Since there is no large difference in the correlation, using a reference image candidate that is included in a higher layer to which a large encoded data amount is allocated and that is unlikely to deteriorate in encoding improves the encoding efficiency. Thus, if the motion amount is less than a threshold value, the reference image selecting unit 107 prioritizes the allocated encoded data amount over the temporal distance. Specifically, the reference image selecting unit 107 selects the $I_0$ picture 200 that has the closest temporal distance among pictures included in the highest layer, as the reference image (see FIG. 6).

Figure 7:
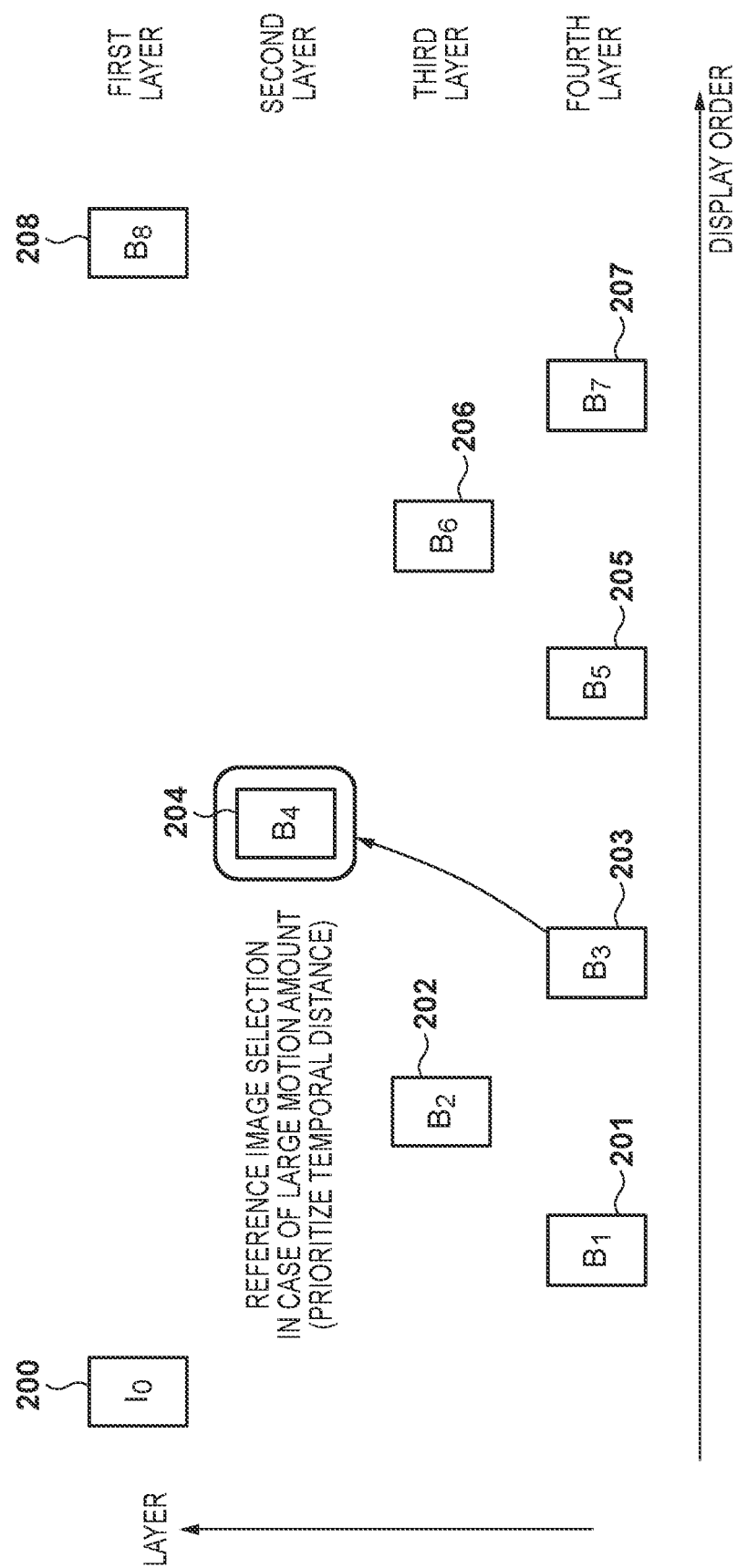
FIG. 7 is a diagram showing an example of selection of a reference image in the case where the encoding target image has a large motion amount.

If the motion amount between the $I_0$ picture 200 and the $B_4$ picture 204 is greater than or equal to the threshold value, it is thought that the $B_3$ picture 203 that is located therebetween in terms of the display timing has also a large motion amount. In this case, since the encoding target image has a large motion amount, using a reference image candidate that has a closer temporal distance increases the correlation, and improves the encoding efficiency. Therefore, if the motion amount is greater than or equal to the threshold value, the reference image selecting unit 107 prioritizes the temporal distance over the allocated encoded data amount. Specifically, among the encoded images (the $B_2$ picture 202 and the $B_4$ picture 204) that have the closest temporal distance, the reference image selecting unit 107 selects the $B_4$ picture 204 that is included in a more higher layer, as the reference image (see FIG. 7).

Similarly, the encoding apparatus 100 also encodes the $B_6$ picture 206, the $B_5$ picture 205, and the $B_7$ picture 207. Motion amounts between the $I_0$ picture 200 and the $B_8$ picture 208 that are located before and after these pictures in terms of the display timing are used to estimate motion amounts.

In this manner, the reference image selecting unit 107 estimates the motion amount of the encoding target image based on the motion amount between encoded images before and after the encoding target image, and selects a reference image in accordance with the motion amount. Accordingly, a reference image having a good encoding efficiency can be selected.

Figure 8:
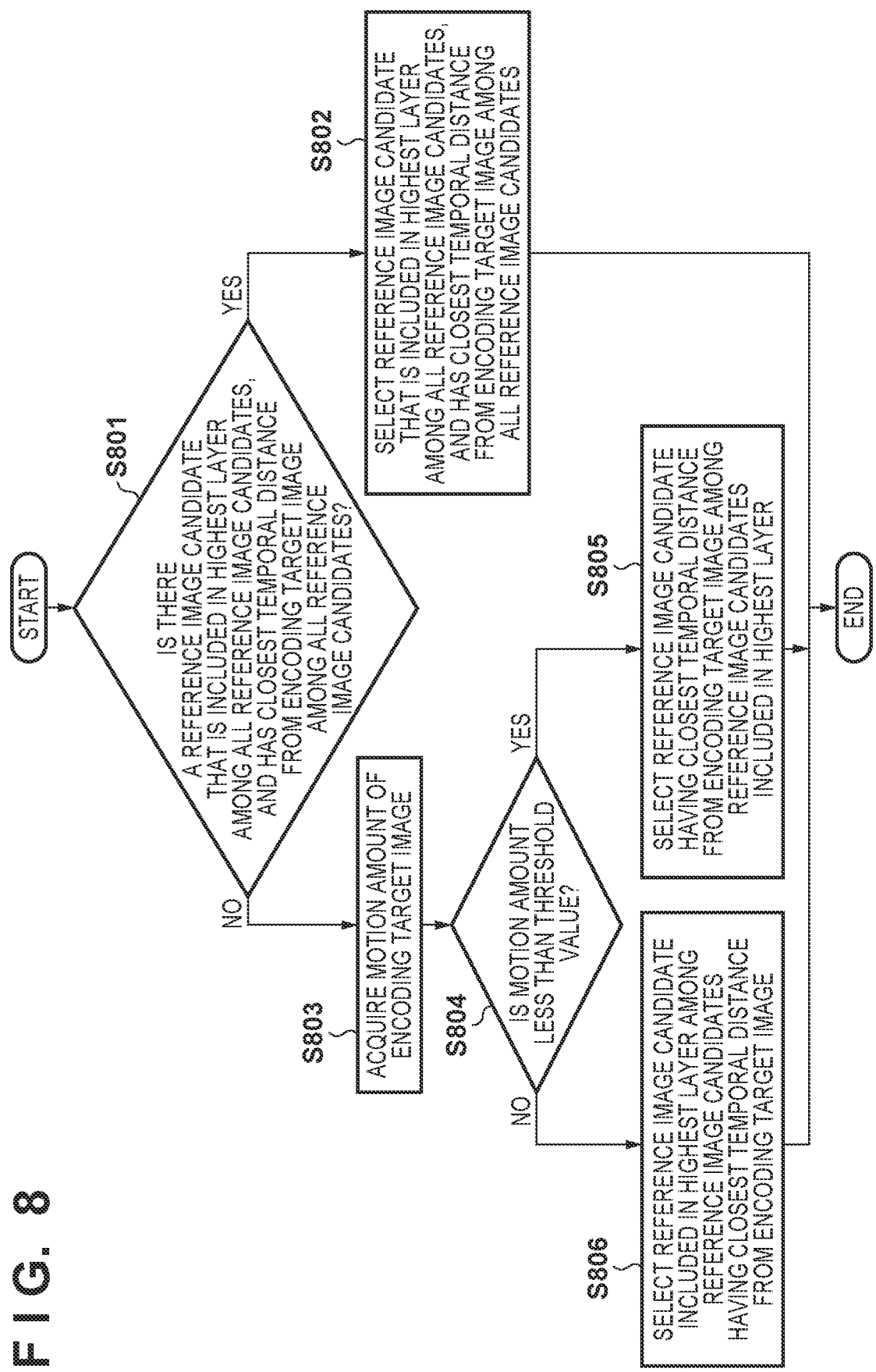
FIG. 8 is a flowchart showing a flow of reference image selection processing according to the first embodiment.

FIG. 8 is a flowchart showing a flow of reference image selection processing according to a first embodiment. First, the reference image selecting unit 107 determines in step S801 whether or not a reference image candidate that is included in the highest layer among all of the reference image candidates, and has the closest temporal distance from the encoding target image among all of the reference image candidates is present. If such a reference image candidate is present, the reference image selecting unit 107 advances the processing to step S802, whereas if such a reference image candidate is not present, the reference image selecting unit 107 advances the processing to step S803.

In step S802, the reference image selecting unit 107 selects, as the reference image, a reference image candidate that is included in the highest layer among all of the reference image candidates, and has the closest temporal distance from the encoding target image among all of the reference image candidates.

In step S803, the reference image selecting unit 107 acquires the motion amount of the encoding target image. For example, the reference image selecting unit 107 acquires the motion amount between the encoded images before and after the encoding target image in terms of the display timing, as the motion amount of the encoding target image.

The reference image selecting unit 107 determines in step S804 whether or not the motion amount of the encoding target image is less than the threshold value. If the motion amount of the encoding target image is less than the threshold value, the reference image selecting unit 107 advances the processing to step S805, whereas if the motion amount of the encoding target image is greater than or equal to the threshold value, the reference image selecting unit 107 advances the processing to step S806.

In step S805, the reference image selecting unit 107 selects, as the reference image, a reference image candidate that has the closest temporal distance from the encoding target image among the reference image candidates included in the highest layer. Accordingly, the reference image is selected with priority on the allocated encoded data amount over the temporal distance.

In step S806, the reference image selecting unit 107 selects, as the reference image, a reference image candidate that is included in the highest layer among the reference image candidates that have the closest temporal distance from the encoding target image. Accordingly, the reference image is selected with priority on the temporal distance over the allocated encoded data amount.

As described above, according to the first embodiment, the encoding apparatus 100 prioritizes either the encoded data amount of the reference image or the temporal distance from the encoding target image, in accordance with the motion amount of the encoding target image, and selects a reference image that is to be used to encode the encoding target image from among a plurality of reference images. If the motion amount of the encoding target image is greater than or equal to the threshold value, the encoding apparatus 100 selects a reference image based on the temporal distance from the encoding target image. For example, if the motion amount of the encoding target image is greater than or equal to the threshold value, the encoding apparatus 100 selects a reference image having the closest temporal distance from the encoding target image. If the motion amount of the encoding target image is greater than or equal to the threshold value, even if there is another reference image having a larger encoded data amount than the reference image having the closest temporal distance from the encoding target image, the encoding apparatus 100 selects the reference image having the closest temporal distance from the encoding target image. Also, if the motion amount of the encoding target image does not reach the threshold value, the encoding apparatus 100 selects a reference image based on the encoded data amount of the reference image. For example, if the motion amount of the encoding target image does not reach the threshold value, the encoding apparatus 100 selects a reference image having the largest encoded data amount among the plurality of reference images. If the motion amount of the encoding target image does not reach the threshold value, even if there is another reference image having a shorter temporal distance from the encoding target image than the reference image having the largest encoded data amount among the plurality of reference images, the encoding apparatus 100 selects the reference image having the largest encoded data amount among the plurality of reference images. This makes it possible to improve encoding efficiency.

Note that although the motion amount between the encoded images before and after the encoding target image in terms of the display timing is used as the motion amount of the encoding target image in the first embodiment, there is no limitation on the method of acquiring the motion amount of the encoding target image. For example, the motion amount of the encoding target image may be acquired using a reference image candidate having the closest temporal distance from the encoding target image among the plurality of reference image candidates and the encoding target image. In this case as well, the vector length of a motion vector, a sum of absolute differences, a motion-compensated sum of absolute differences, or the like can be used as the motion amount.

Also, although the case where only one reference image is selected has been described in the first embodiment, the number of reference images is not limited to one, and the first embodiment can also be applied to the case where two or more reference images are used. For example, when two reference images are used, selection processing that has been described in the first embodiment is applied to one reference image, and selection processing that is different from in the first embodiment can be applied to the other reference image. Also, the selection processing of the first embodiment may be applied to the two reference images.

Also, although the first embodiment has been described using the HEVC coding method as an example, the present invention is applicable to any coding method having a hierarchical structure. Also, the first embodiment can also be applied to an encoding method that does not have a hierarchical structure as long as it is a coding method in which encoded data amounts between the reference image candidates change. In this case, the section that describes the hierarchy of layers in the above description is interpreted as whether or not the reference image candidate has a larger encoded data amount. For example, in step S805 in FIG. 8, the reference image selecting unit 107 selects a reference image candidate having a larger encoded data amount with priority. Also, the reference image selecting unit 107 may prioritize a reference image candidate having a larger encoded data amount, and select, with priority, a reference image candidate that has a closer temporal distance from the encoding target image from among reference image candidates that have an approximately equal encoded data amount. Although there is no particular limitation on the range of an "approximately equal" encoded data amount, the narrower the range is, the more a reference image candidate having a larger encoded data amount is prioritized. Similarly, in step S806 in FIG. 8, for example, the reference image selecting unit 107 may prioritize a reference image candidate having a closer temporal distance from the encoding target image, and select, with priority, a reference image candidate having a larger encoded data amount from among reference image candidates that have an approximately equal temporal distance from the encoding target image. Although there is no particular limitation on the range of an "approximately equal" temporal distance, the narrower the range is, the more a reference image candidate having a closer temporal distance is prioritized.

Second Embodiment

In a second embodiment, a case where two reference images are selected will be described. In the present embodiment, the basic configuration of the encoding apparatus 100 is similar to the configuration of the first embodiment. Hereinafter, the differences from the first embodiment will be described mainly.

In the second embodiment as well, similarly to the first embodiment, encoding in a random access GOP structure in FIG. 2 will be described as an example. After the $I_0$ picture 200 is encoded, the encoding apparatus 100 encodes the $B_8$ picture 208. In this case, the reference image is the $I_0$ picture 200. Although the case where two reference images are used will be described in the second embodiment, one reference image is used only when the $B_8$ picture 208 is encoded. The motion predicting unit 105 detects motion amounts of each CTU, and notifies the reference image selecting unit 107 of the detected motion amounts.

For each picture, the reference image selecting unit 107 performs cumulative addition on the motion amounts of each CTU. Accordingly, when encoding of the $B_8$ picture 208 is completed, the overall motion amount of the $B_8$ picture 208 can be obtained. The overall motion amount of the $B_8$ picture 208 is held by the reference image selecting unit 107 as the motion amount between the $B_8$ picture 208 and the $I_0$ picture 200.

Next, the encoding apparatus 100 encodes the $B_4$ picture 204. In this case, two pictures, namely, the $I_0$ picture 200 and the $B_8$ picture 208, are the reference images. The motion predicting unit 105 separately outputs, to the reference image selecting unit 107, the motion amounts obtained when motion detection is performed using the $I_0$ picture 200 as the reference image, and the motion amounts obtained when motion detection is performed using the $B_8$ picture 208 as the reference image.

The reference image selecting unit 107 performs cumulative addition on the motion amounts obtained when using the $I_0$ picture 200 as the reference image and the motion amounts obtained when using the $B_8$ picture 208 as the reference image independently. Accordingly, when encoding of the $B_4$ picture 204 is completed, the motion amount between the $B_4$ picture 204 and the $I_0$ picture 200, and the motion amount between the $B_4$ picture 204 and the $B_8$ picture 208 are held by the reference image selecting unit 107.

Next, the encoding apparatus 100 encodes the $B_2$ picture 202. In this case, there are three pictures, namely, the $I_0$ picture 200, the $B_4$ picture 204, and the $B_8$ picture 208, as the reference image candidates. The $I_0$ picture 200 is one of encoded images that are included in the highest layer and have the closest temporal distance from the $B_2$ picture 202 that is the encoding target image. Therefore, the reference image selecting unit 107 selects the $I_0$ picture 200 as one reference image.

Regarding the $B_4$ picture 204 and the $B_8$ picture 208, which are the remaining reference image candidates, the $B_4$ picture 204 has a closer temporal distance, and the $B_8$ picture 208 is included in a higher layer. In view of this, the reference image selecting unit 107 selects, as the reference image, either reference image candidate using a method similar to in the first embodiment, in accordance with the motion amount between the $B_4$ picture 204 and the $I_0$ picture 200. Specifically, if the motion amount is less than the threshold value, the reference image selecting unit 107 selects the $B_8$ picture 208 included in a higher layer as the reference image, and if the motion amount is greater than or equal to the threshold value, selects the $B_4$ picture 204 having a closer temporal distance as the reference image.

Similarly, the encoding apparatus 100 encodes the $B_1$ picture 201.

Next, the encoding apparatus 100 encodes the $B_3$ picture 203. In this case, there are five pictures, namely, the $I_0$ picture 200, the $B_1$ picture 201, the B2 picture 202, the $B_4$ picture 204, and the $B_8$ picture 208, as the reference image candidates (see FIG. 3). Among the reference image candidates, the reference image candidates included in the highest layer are the $I_0$ picture 200 and the $B_8$ picture 208 (see FIG. 4). Also, among the reference image candidates, the reference image candidates having the closest temporal distance from the $B_3$ picture 203 that is the encoding target image are the $B_2$ picture 202 included in the third layer and the $B_4$ picture 204 in the second layer (see FIG. 5).

If two reference images are selected in such a situation, the following three methods are conceivable, for example. The first method is a method of selecting two encoded images included in the highest layer as the reference images. A second method is a method of selecting two encoded images having the closest temporal distance as the reference images. A last method is a method of selecting one reference image from the encoded images included in the highest layer, and selecting another reference image from encoded images having the closest temporal distance.

If a plurality of reference image candidates is present in this manner, the reference image selecting unit 107 selects the reference image adaptively. In order to estimate the motion amount of the $B_3$ picture 203 that is the encoding target image, the reference image selecting unit 107 uses a motion amount between the $I_0$ picture 200 and the $B_4$ picture 204 that are located before and after the $B_3$ picture 203 in terms of the display timing. The motion amount between the $I_0$ picture 200 and the $B_4$ picture 204 is detected when the $B_4$ picture 204 has been encoded previously and is held by the reference image selecting unit 107.

The reference image selecting unit 107 selects the reference image based on the motion amount of the $B_3$ picture 203 that is the encoding target image. The reference image selecting unit 107 uses two threshold values that are in the relationship of threshold value 1<threshold value 2 to classify motion amounts into three stages, and selects the reference image.

Figure 9:
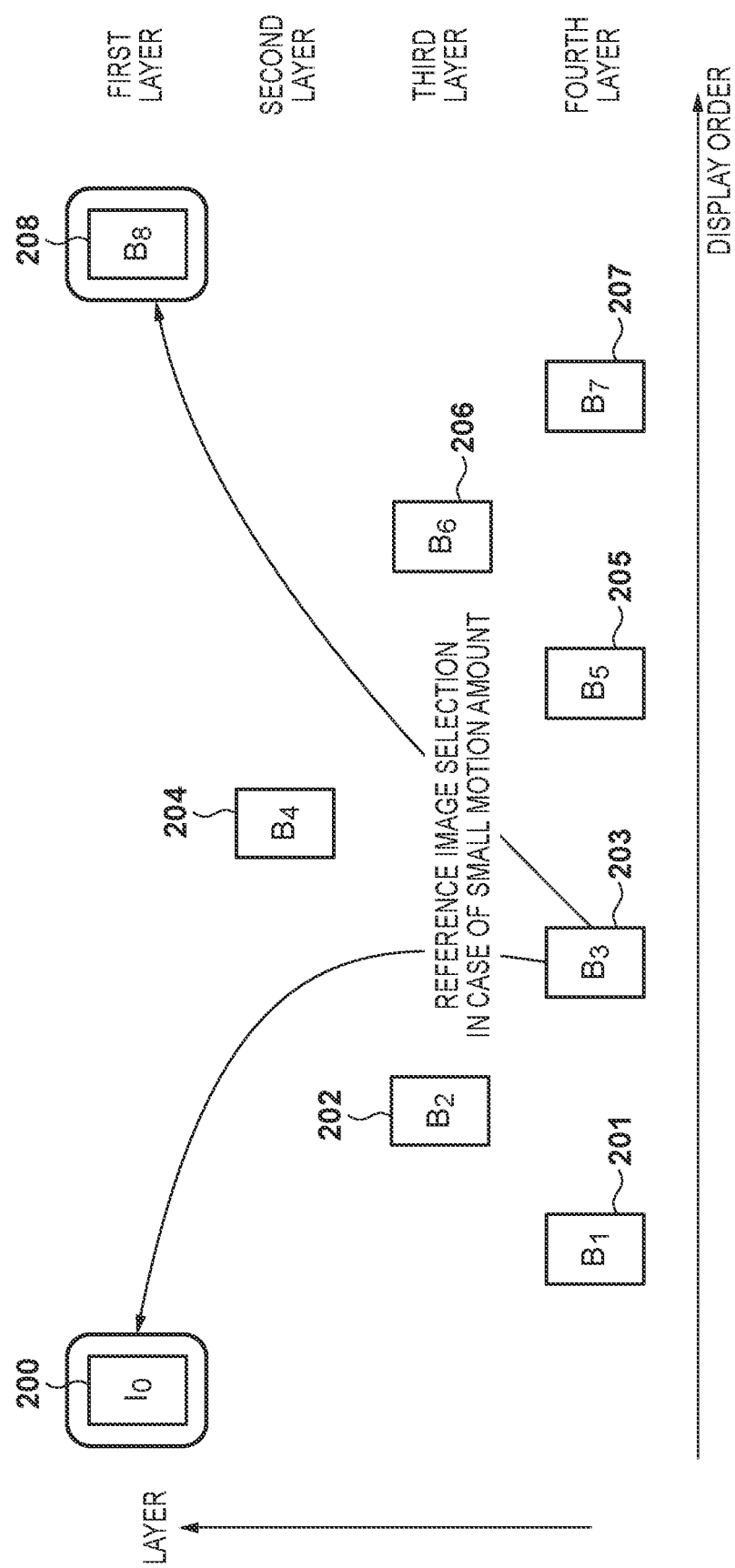
FIG. 9 is a diagram showing an example of selection of two reference images in the case where the encoding target image has a small motion amount.

If the motion amount between the $I_0$ picture 200 and the $B_4$ picture 204 is less than the threshold value 1, it is thought that the $B_3$ picture 203 located therebetween in terms of the display timing also has a small motion amount. In this case, it is thought that because the encoding target image has a small motion amount, regardless of the temporal distances between the encoding target image and each reference image candidate, all reference image candidates have high correlation. Since there is no large difference in the correlation, using a reference image candidate that is included in a higher layer to which a large encoded data amount is allocated and that is unlikely to deteriorate in encoding improves encoding efficiency. Therefore, if the motion amount is less than the threshold value 1, the reference image selecting unit 107 prioritizes the allocated encoded data amount over the temporal distance, for the two reference images. Specifically, the reference image selecting unit 107 selects the $I_0$ picture 200 and the $B_8$ picture 208 included in the highest layer as the reference images (see FIG. 9).

Figure 10:
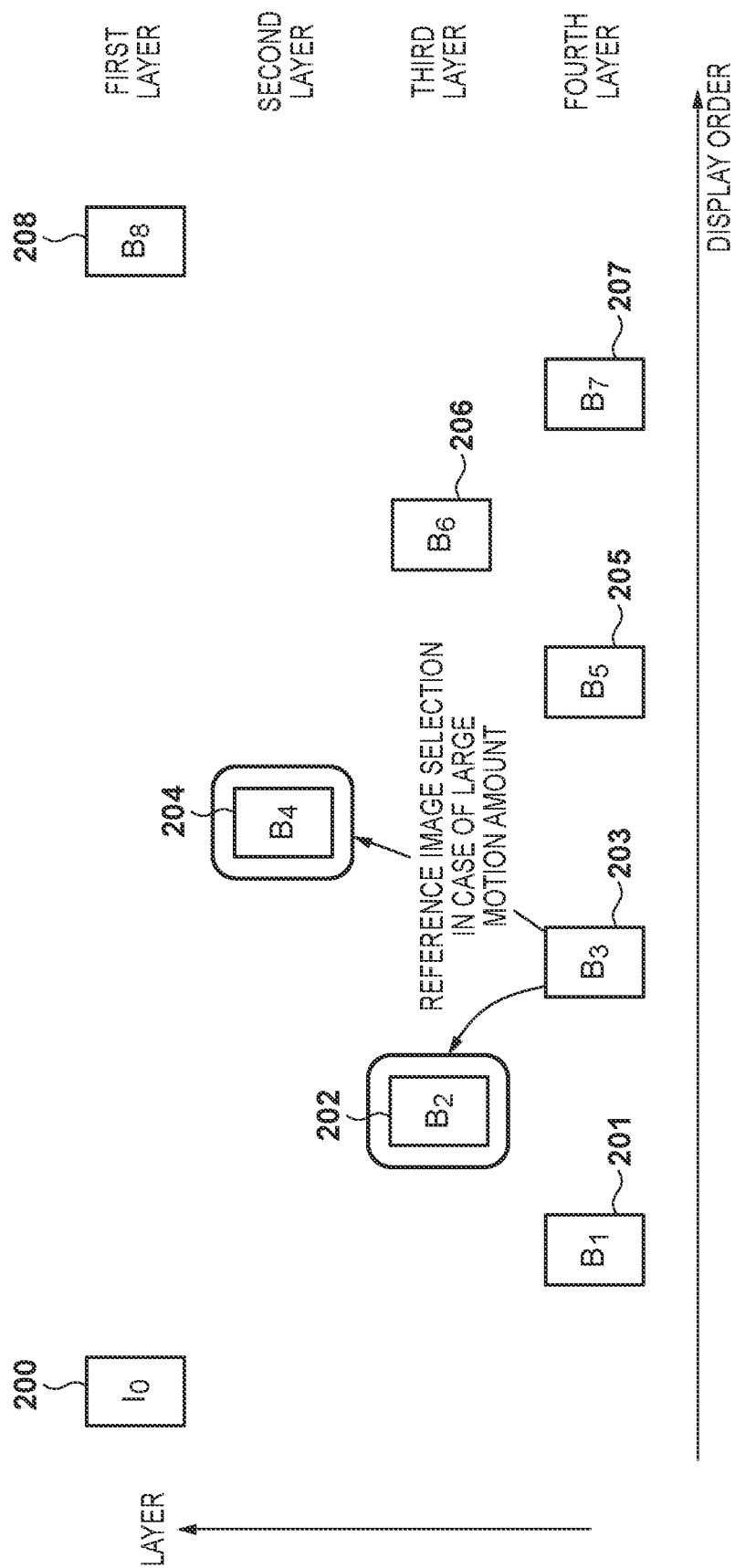
FIG. 10 is a diagram showing an example of selection of two reference images in the case where the encoding target image has a large motion amount.

If the motion amount between the $I_0$ picture 200 and the $B_4$ picture 204 is greater than or equal to the threshold value 2, it is thought that the $B_3$ picture 203 located therebetween in terms of time has a large motion amount as well. In this case, since the encoding target image has a large motion amount, using a reference image candidate that has a closer temporal distance increases the correlation, and improves the encoding efficiency. Therefore, if the motion amount is greater than or equal to the threshold value 2, the reference image selecting unit 107 prioritizes the temporal distance over the allocated encoded data amount, for the two reference images. Specifically, the reference image selecting unit 107 selects the $B_2$ picture 202 and the $B_4$ picture 204 that have the closest temporal distance as the reference image (see FIG. 10).

Figure 11:
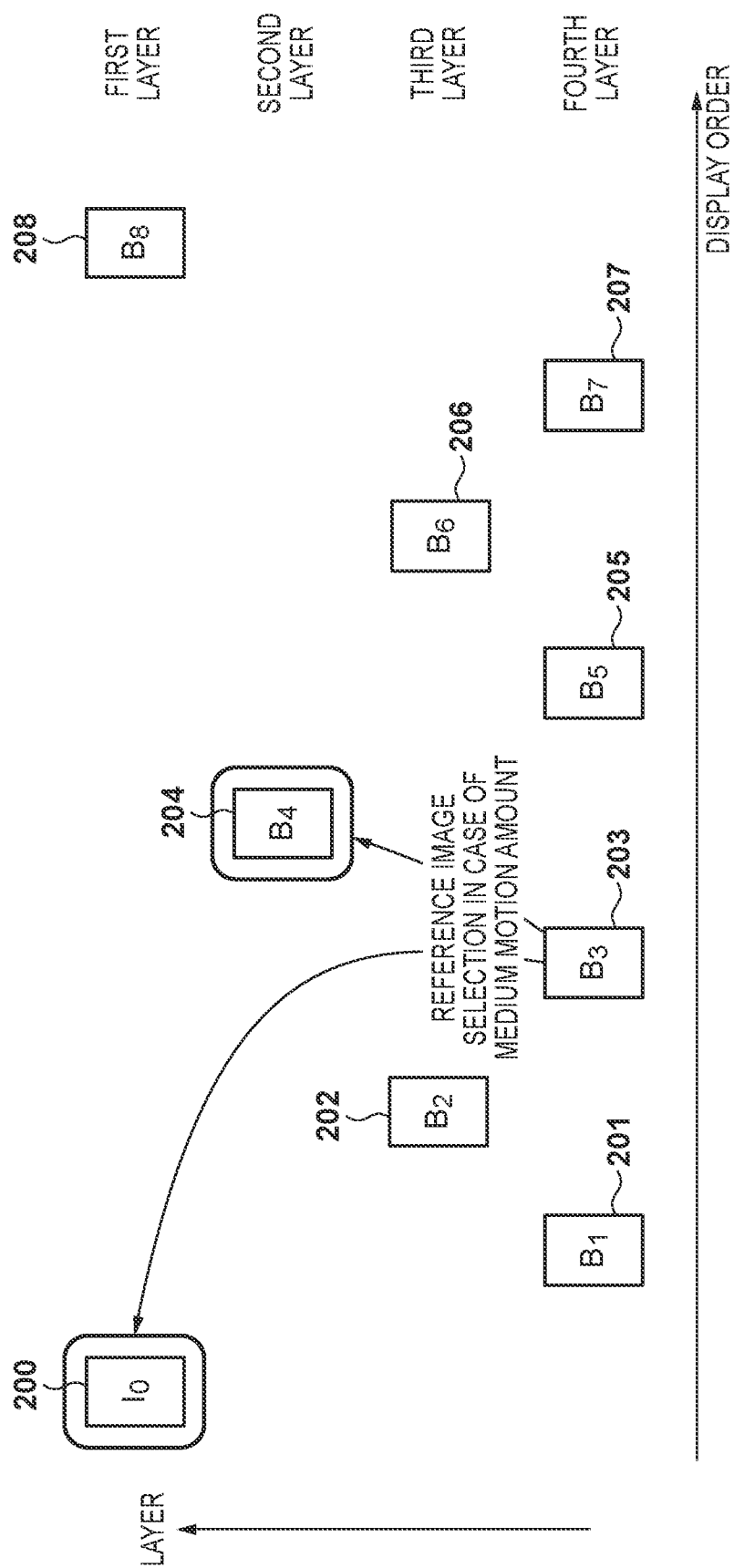
FIG. 11 is a diagram showing an example of selection of two reference images in the case where the encoding target image has a medium motion amount.

If the motion amount between the $I_0$ picture 200 and the $B_4$ picture 204 is greater than or equal to the threshold value 1 and less than the threshold value 2, it is thought that the $B_3$ picture 203 located therebetween in terms of time has a medium motion amount. In this case, the reference image selecting unit 107 adopts selection criteria for both a small motion amount and a large motion amount. Specifically, the reference image selecting unit 107 prioritizes the allocated encoded data amount over the temporal distance for one reference image, and prioritizes the temporal distance over the allocated encoded data amount for the other reference image. The reference image selecting unit 107 selects, as the first reference image, the $I_0$ picture 200 that has the closest temporal distance, among reference image candidates included in the highest layer. Then, the reference image selecting unit 107 selects, as the second reference image, the $B_4$ picture 204 that is included in a more higher layer, among the reference image candidates (the $B_2$ picture 202 and the $B_4$ picture 204) that have the closest temporal distance (see FIG. 11).

Similarly, the encoding apparatus 100 also encodes the $B_6$ picture 206, the $B_5$ picture 205, and the $B_7$ picture 207. The motion amount between the $B_4$ picture 204 and the $B_8$ picture 208 that are located before and after these pictures in terms of the display timing is used to estimate a motion amount.

In this manner, the reference image selecting unit 107 estimates the motion amount of the encoding target image based on the motion amount between encoded images before and after the encoding target image, and selects a reference image in accordance with the motion amount. Accordingly, a reference image having a good encoding efficiency can be selected.

FIG. 12 is a flowchart showing a flow of reference image selection processing according to the second embodiment. First, the reference image selecting unit 107 determines in step S1201 whether or not two reference image candidates that are included in the highest layer among all of reference image candidates, and have the closest temporal distance from the encoding target image among all of the reference image candidates are present. If two such reference image candidates are present, the reference image selecting unit 107 advances the processing to step S1202, whereas if two such reference image candidates are not present, the reference image selecting unit 107 advances the processing to step S1203.

In step S1202, the reference image selecting unit 107 selects, as the reference images, two reference image candidates that are included in the highest layer among all of the reference image candidates, and have the closest temporal distance from the encoding target image among all of the reference image candidates.

In step S1203, the reference image selecting unit 107 acquires the motion amount of the encoding target image. For example, the reference image selecting unit 107 acquires, as the motion amount of the encoding target image, the motion amount between the encoded images before and after the encoding target image in terms of the display timing.

The reference image selecting unit 107 determines in step S1204 whether or not the motion amount of the encoding target image is less than the threshold value 1. If the motion amount of the encoding target image is less than the threshold value 1, the reference image selecting unit 107 advances the processing to step S1205, whereas if the motion amount of the encoding target image is greater than or equal to the threshold value 1, the reference image selecting unit 107 advances the processing to step S1206.

In step S1205, the reference image selecting unit 107 selects two reference image candidates in order from a higher layer, as the reference images. If a plurality of reference image candidates that are in the same layer rank are present, the reference image selecting unit 107 selects reference image candidates that have the closest temporal distance from the encoding target image. Accordingly, regarding both of the reference images, the reference images are selected with priority on the allocated encoded data amount over the temporal distance.

The reference image selecting unit 107 determines in step S1206 whether or not the motion amount of the encoding target image is greater than or equal to the threshold value 2. If the motion amount of the encoding target image is greater than or equal to the threshold value 2, the reference image selecting unit 107 advances the processing to step S1207, whereas if the motion amount of the encoding target image is less than the threshold value 2, the reference image selecting unit 107 advances the processing to step S1208.

In step S1207, the reference image selecting unit 107 selects two reference image candidates in order from a candidate having a closer temporal distance from the encoding target image, as the reference images. If a plurality of reference image candidates that are in the same temporal distance rank are present, the reference image selecting unit 107 selects a reference image candidate that is included in a more higher layer. Accordingly, regarding both of the reference images, the reference images are selected with priority on the temporal distance over the allocated encoded data amount.

In step S1208, the reference image selecting unit 107 selects, as the first reference image, a reference image candidate that has the closest temporal distance from the encoding target image, among reference image candidates included in the highest layer. Also, the reference image selecting unit 107 selects, as the second reference image, a reference image candidate included in the highest layer, among reference image candidates that have the closest temporal distance from the encoding target image. Accordingly, regarding the first reference image, the reference image is selected with priority on the allocated encoded data amount over the temporal distance, and regarding the other reference image, the reference image is selected with priority on the temporal distance over the allocated encoded data amount.

As described above, according to the second embodiment, regarding each of two reference images, the encoding apparatus 100 prioritizes either the encoded data amount of a reference image or the temporal distance from the encoding target image, in accordance with the motion amount of the encoding target image, and selects a reference image from reference image candidates. This makes it possible to improve encoding efficiency.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225618, filed Nov. 18, 2015 which is hereby incorporated by reference herein in its entirety.

What is claimed is:

1. An encoding apparatus comprising at least one processor and/or at least one circuit which function as units comprising:
    an acquiring unit configured to acquire a motion amount of an encoding target image;
    a selecting unit configured to select a reference image from a plurality of reference image candidates; and
    an encoding unit configured to encode the encoding target image by motion compensated predictive coding in which the selected reference image is referenced,
    wherein if the motion amount is less than a threshold value, the selecting unit selects a reference image candidate having a larger encoded data amount from another layer, and if the motion amount is greater than the threshold value, the selecting unit selects a reference image candidate having a closer temporal distance from the encoding target image,
    wherein when the selecting unit selects a reference image candidate having a larger encoded data amount, the selecting unit selects a reference image candidate having a closer temporal distance from the encoding target image, from among reference image candidates that have an approximately equal encoded data amount, and
    wherein the motion amount is a vector length of a motion vector, or a motion compensated sum of absolute differences between the encoding target image and the reference image.

2. The encoding apparatus according to claim 1, wherein in a case where the selecting unit selects two reference images from the plurality of reference image candidates:
    (1) if the motion amount is less than a first threshold value, the selecting unit selects reference image candidates having a larger encoded data amount,
    (2) if the motion amount is greater than a second threshold value that is greater than the first threshold value, the selecting unit selects reference image candidates having a closer temporal distance from the encoding target image, and
    (3) if the motion amount is greater than the first threshold value and is less than the second threshold value, the selecting unit selects a reference image candidate having a larger encoded data amount as one reference image, and selects a reference image candidate having a closer temporal distance from the encoding target image as another reference image.

3. The encoding apparatus according to claim 1, wherein when the selecting unit selects a reference image candidate having a closer temporal distance from the encoding target image with priority, the selecting unit selects a reference image candidate having a larger encoded data amount, from among reference image candidates that have an approximately equal temporal distance from the encoding target image.

4. The encoding apparatus according to claim 1, wherein the encoding unit performs encoding conforming to an HEVC (high efficiency video coding) method, and
    wherein when the selecting unit selects a reference image candidate having a larger encoded data amount, the selecting unit selects a reference image candidate included in a higher layer.

5. The encoding apparatus according to claim 1, wherein the acquiring unit acquires the motion amount of the encoding target image based on a motion amount between a reference image candidate having a display timing before the encoding target image and a reference image candidate having a display timing after the encoding target image.

6. The encoding apparatus according to claim 5, wherein the acquiring unit acquires, as the motion amount of the encoding target image, a vector length of a motion vector between a reference image candidate having a display timing before the encoding target image and a reference image candidate having a display timing after the encoding target image.

7. The encoding apparatus according to claim 5, wherein the acquiring unit acquires, as the motion amount of the encoding target image, a sum of absolute differences between a reference image candidate having a display timing before the encoding target image and a reference image candidate having a display timing after the encoding target image.

8. The encoding apparatus according to claim 5, wherein the acquiring unit acquires, as the motion amount of the encoding target image, a motion-compensated sum of absolute differences between a reference image candidate having a display timing before the encoding target image and a reference image candidate having a display timing after the encoding target image.

9. The encoding apparatus according to claim 1, wherein the acquiring unit acquires the motion amount of the encoding target image based on a motion amount between the encoding target image and a reference image candidate having a closest temporal distance from the encoding target image among the plurality of reference image candidates.

10. The encoding apparatus according to claim 9, wherein the acquiring unit acquires, as the motion amount of the encoding target image, a vector length of a motion vector between the encoding target image and a reference image candidate having a closest temporal distance from the encoding target image among the plurality of reference image candidates.

11. The encoding apparatus according to claim 9, wherein the acquiring unit acquires, as the motion amount of the encoding target image, a sum of absolute differences between the encoding target image and a reference image candidate having a closest temporal distance from the encoding target image among the plurality of reference image candidates.

12. The encoding apparatus according to claim 9, wherein the acquiring unit acquires, as the motion amount of the encoding target image, a motion-compensated sum of absolute differences between the encoding target image and a reference image candidate having a closest temporal distance from the encoding target image among the plurality of reference image candidates.

13. The encoding apparatus according to claim 1, further comprising:
  an image sensor configured to generate the encoding target image.

14. An encoding method comprising:
  acquiring a motion amount of an encoding target image;
  selecting a reference image from a plurality of reference image candidates; and
  encoding the encoding target image by motion-compensated predictive coding in which the selected reference image is referenced,
  wherein if the motion amount is less than a threshold value, the selecting selects a reference image candidate having a larger encoded data amount from another layer, and if the motion amount is greater than the threshold value, the selecting selects a reference image candidate having a closer temporal distance from the encoding target image,
  wherein when the selecting selects a reference image candidate having a larger encoded data amount, the selecting selects a reference image candidate having a closer temporal distance from the encoding target image, from among reference image candidates that have an approximately equal encoded data amount, and
  wherein the motion amount is a vector length of a motion vector, or a motion compensated sum of absolute differences between the encoding target image and the reference image.

15. A non transitory computer readable storage medium which stores a program for causing a computer to execute an encoding method comprising:
  acquiring a motion amount of an encoding target image;
  selecting a reference image from a plurality of reference image candidates; and
  encoding the encoding target image by motion-compensated predictive coding in which the selected reference image is referenced,
  wherein if the motion amount is less than a threshold value, the selecting selects a reference image candidate having a larger encoded data amount from another layer, and if the motion amount is greater than the threshold value, the selecting selects a reference image candidate having a closer temporal distance from the encoding target image,
  wherein when the selecting selects a reference image candidate having a larger encoded data amount, the selecting selects a reference image candidate having a closer temporal distance from the encoding target image, from among reference image candidates that have an approximately equal encoded data amount, and
  wherein the motion amount is a vector length of a motion vector, or a motion compensated sum of absolute differences between the encoding target image and the reference image.

* * * * *